July 15, 1958
C. W. GRAY
2,843,418
EXPANDABLE CAMPING TRAILERS
Filed Nov. 9, 1953
2 Sheets-Sheet 2
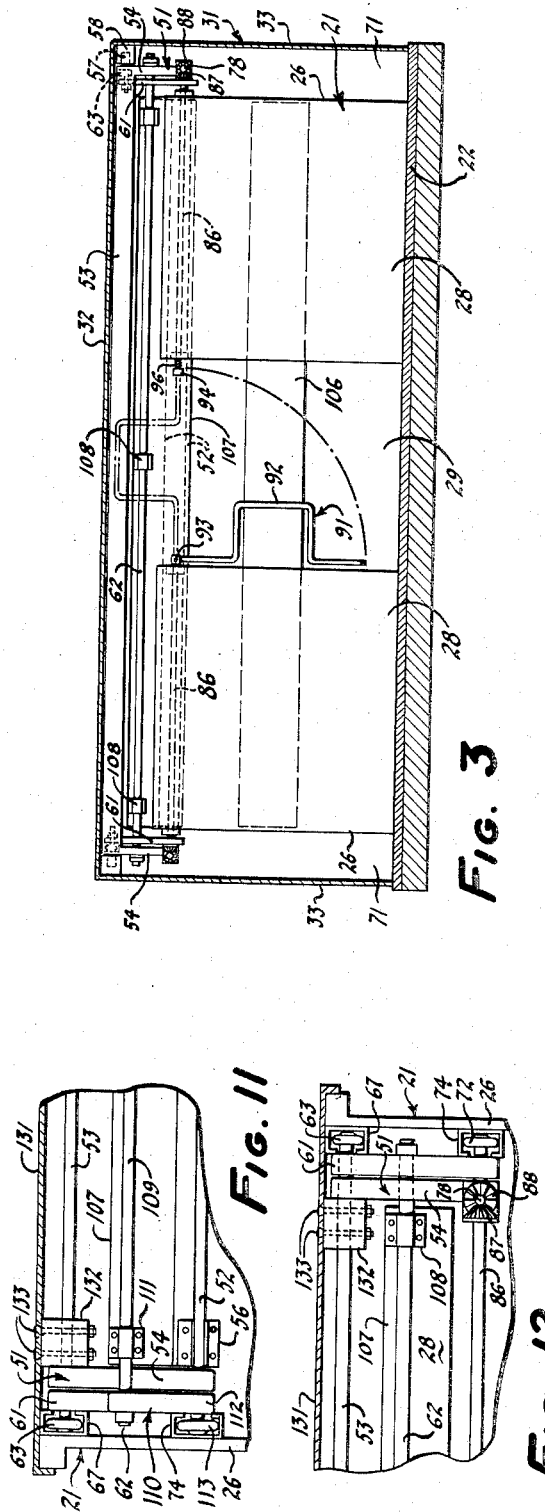
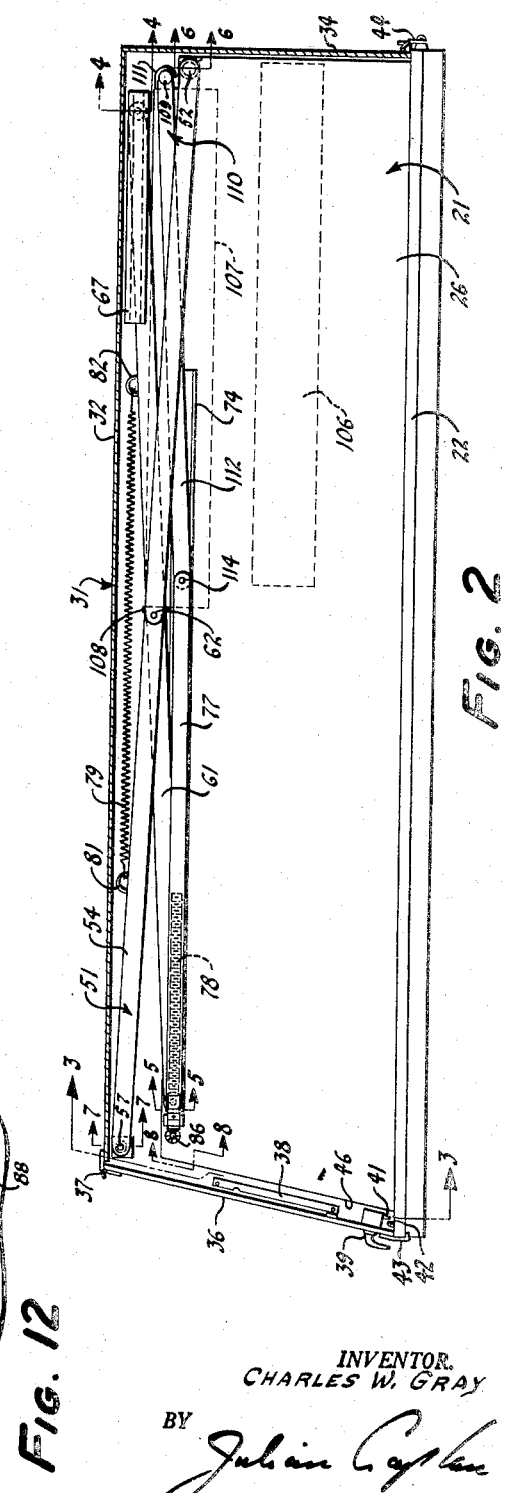
INVENTOR.
CHARLES W. GRAY
BY
ATTORNEY United States Patent Office 2,843,418
Patented July 15, 1958

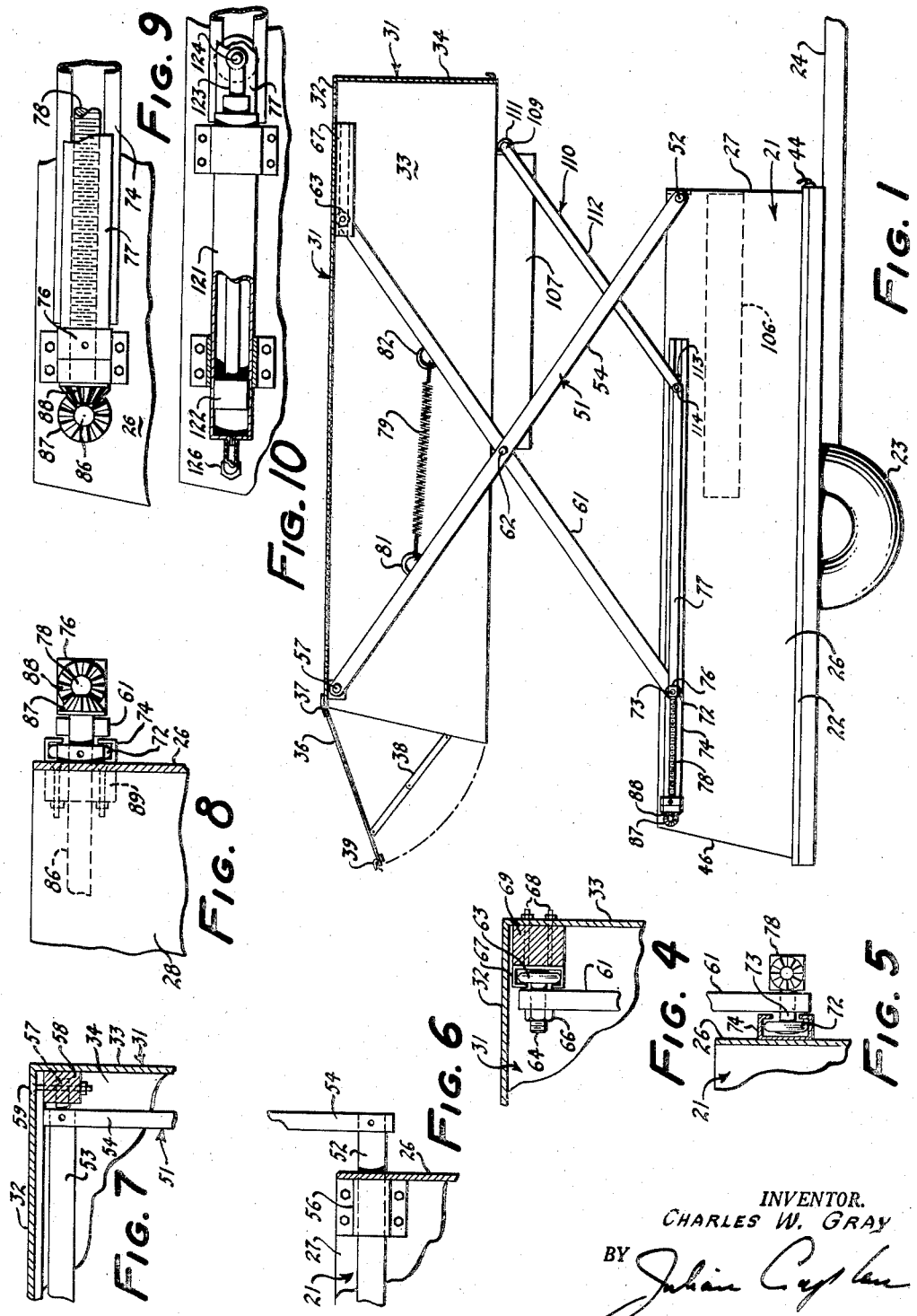

2,843,418
EXPANDABLE CAMPING TRAILERS
Charles W. Gray, Walnut Creek, Calif.
Application November 9, 1953, Serial No. 390,793
10 Claims. (Cl. 296—23)

This invention relates to new and useful improvements in expandable camping trailers.

The present invention relates to a camping trailer or the like which may be folded to a compact position while the trailer is being towed from place to place and, as required, conveniently and rapidly expanded or unfolded to a position for use. Even in its retracted position, the trailer provides sufficient room for storing camping equipment and the like.

The present invention in essence comprises a bottom shell mounted on wheels and a top or cover which may be raised and lowered with respect to the bottom. Between the bottom and the cover are two bunks which extend cross-wise, the upper bunk being movable in its elevation both relative to the bottom and also relative to the cover. Thus, when the trailer is in closed position, the upper bunk is lowered in close proximity to the lower bunk, and the cover is in close proximity to the upper bunk. When the trailer is in open position, the upper bunk is raised above the lower bunk a sufficient distance to provide convenient access to the lower bunk and at the same time the upper bunk is spaced below the cover so as to provide convenient access to the upper bunk. The foregoing described arrangement of bottom, cover, and bunks is made possible by a unique leverage system hereinafter described in detail. The leverage system enables the user to open and close the trailer with a minimum of effort with only a few manual operations, and in a fraction of the time required to perform the corresponding operations in other equipment of this general nature.

Other objects of the present invention will become apparent upon reading the following specification and referring to the accompanying drawings in which similar characters of reference represent corresponding parts in each of the several views.

In the drawings:

Fig. 1 is a side elevation of the trailer in open position with the depending side of the cover removed more clearly to illustrate the parts.

Fig. 2 is an enlarged side elevation of the device similar to Fig. 1 showing the trailer in closed position.

Fig. 3 is an end elevation thereon with the end of the cover removed.

Fig. 4 is a fragmentary sectional view taken substantially along the line 4—4 of Fig. 2.

Fig. 5 is a fragmentary sectional view taken substantially along the line 5—5 of Fig. 2.

Fig. 6 is a fragmentary sectional view taken substantially along the line 6—6 of Fig. 2.

Fig. 7 is a fragmentary sectional view taken substantially along the line 7—7 of Fig. 2.

Fig. 8 is a fragmentary sectional view taken substantially along the line 8—8 of Fig. 2.

Fig. 9 is an enlarged side elevation of a portion of the lifting mechanism shown with the trailer in closed position.

Fig. 10 is a fragmentary view showing a modified means for lifting the top.

Fig. 11 is a fragmentary section of a modified construction as viewed from the front with the front wall broken away.

Fig. 12 is a fragmentary section of the structure of Fig. 11 as viewed from the rear.

The present invention comprises a camping trailer providing means for transportation of camping equipment and at the same time providing, when in open position, sleeping accommodations comprising a pair of bunks. It will be understood that the bunks may be wide enough to accommodate two persons thereby affording sleeping accommodations for four persons. An important feature of the invention resides in the fact that in open position the trailer provides an upper bunk depressed below the cover a sufficient distance to enable the occupants to enter and leave the bunk without difficulty and a lower bunk fixed to the bottom of the trailer, the upper bunk being raised above the lower bunk a sufficient distance to provide convenient access to the lower bunk. On the other hand, when the trailer is in closed position, the cover comes down close to the bottom and the upper bunk assumes a position relative to the lower bunk and the cover which makes for a compact, relatively low, piece of equipment which is easily transported.

The bottom 21 of the trailer is formed with a floor 22 supported by wheels 23 and towed by a tongue 24 in conventional manner. Substantially vertical sides 26 and a front 27 extend up from floor 22, the term "front" being used in this specification of the invention in the sense of the direction in which the trailer is normally towed. At the rear, transverse end boards 28 are employed, a gap 29 between the inner edges of the end boards being provided for convenient access to the interior. In the modification of the invention shown in Figs. 1 to 9, inclusive, cover 31 is formed somewhat wider and longer in outline than the bottom 21 to overhang the same. Cover 31 has a top 32, sides 33, and front 34. A rear end door 36 is hinged to the top 32 by hinges 37 to provide access to the interior of the trailer, the door 36 being supported in open position by a pair of toggle-hinge props 38, one on each side of the trailer, as shown particularly in Fig. 1. A lock 39 is secured adjacent the bottom edge of the door 36, the lock being preferably provided both with an interior retractable spring bolt 41 which fits back of a catch 42 on the floor 22 and also with an exterior rotatable hook 43 which fits under the rear edge of the floor, the two fastening means cooperating to keep the cover in place. Further to facilitate attachment of the cover 31 to the bottom 21 when the trailer is in closed position, a plurality of catches 44 of the type used on trunks and other luggage may be provided.

In order to enable movement of the cover 31 from closed to open position, the rear edges 46 of the sides 26 are slanted inwardly toward the top and the rear door 36 in closed position likewise is slanted, all as has best been shown in Fig. 2.

In moving from open to closed position, the cover 31 is lifted upwardly and forwardly relative to the bottom 21 by a leverage arrangement. The main or outer lever 51 is rectangular in plan, having round transverse shafts 52 and 53, front and rear and connecting longitudinal arms 54 on each side. At the front of the trailer, front transverse shaft 52 is rotatably mounted along the upper edge of the front 27 by brackets 56. The rear corners of the rectangular members are connected to the cover by outwardly extending pins 57 received in blocks 58 fastened to cover 31 by bolts 59 (see Fig. 7). As shown in Fig. 6, which is a detail of the connection of the front transverse shaft 52 to the bottom 21, the front transverse shaft 52 is held rotatably to the upper edge of the front 27 by brackets 56, the longitudinal arms 54 being spaced outwardly from the sides 26 in order to provide clearance for the other levers hereinafter described. The main leverage arrangement 51 heretofore described results in a lifting and forward movement of the cover 31 relative to the bottom 21, actuated as hereinafter described.

Spaced immediately inwardly of the longitudinal arms 54 on each side of the trailer is a longitudinally extending inner lever 61 which is pivotally connected to the adjacent arm 54 by transverse rod 62 approxmately mid-way of the length of the two members. The front end of each inner lever 61 is slidably connected adjacent the upper front corner of side 33 of cover 31 and the rear end of each inner lever is slidably connected adjacent the upper rear corner of the side 26 of the bottom 21.

The connection between each inner lever 61 and the cover 31 is shown in detail in Fig. 4. The upper end of the lever is connected to a roller 63 by means of bolt 64 and nut 66. The roller 63 is received within a track-way 67 which extends longitudinally and is connected to the inside of the side 33 by bolts 68, a spacing block 69 being interposed between the track-way 67 and the side 33 to provide clearance for the main lever 51 and to maintain the space 71 between the cover and bottom best shown in Fig. 3. As shown in Fig. 5, the lower end of each inner lever 61 is likewise provided with a roller 72 connected thereto by means of bolt 73, which roller 72 is received in a trackway 74 mounted horizontally along the length of the upper edge of the side 26 of the bottom. Bolt 73 connects roller 72 to the rear end of lever 61 and nut 76 attached to the front end of horizontal link 77 extending parallel and outside track-way 74. Nut 76 is threaded on horizontal longitudinal threaded shaft 78 so that as shaft 78 is turned, as hereinafter set forth, nut 76 is moved longtudinally, horizontally of the trailer, this movement being transmitted to the rear end of lever 61 and also to the rear end of link 77. To counter-balance the weight of the cover 31 and facilitate movement of the leverage system, a helical spring 79 is provided, one end of the spring being attached by means of eye 81 to arm 54 and the other end being attached by means of eye 82 to lever 61, on opposite sides of the point 62 of pivotal connection.

One means for rotating screw 78, as illustrated herein, comprises a transverse shaft 86 bearing at its outer end a bevel gear 87 which meshes with the bevel gear 88 on the rear end of threaded shaft 78. Transverse shaft 86 is supported by means of bearings 89 mounted on vertical end boards 28 at the back of the trailer. Transverse shafts 86 may be rotated by any suitable means, but to maintain equal movement of the two threaded shafts 78 on the opposite sides of the trailer, the device shown in Fig. 3 is particularly advantageous. This comprises a crank 91 having an offset handle portion 92, the crank in inoperative position hanging down so as to provide access to the interior of the trailer and being movable to a horizontal position as shown in dotted lines in Fig. 3, whereby it is operative. The knuckle-joint 93 between one end of the crank 91 and one of the transverse shafts 86 is permanent. The opposite end of the crank 91 is detachably connected to the right-hand transverse shaft 86, one suitable means of connection comprising forming the end of the crank 91 in a non-circular shape and providing a socket 94 of complementary shape on the inner end of the transverse shaft 86, the socket being slidable inwardly and outwardly on the end of transverse shaft and being biased outwardly by means of spring 96. Upon manual retraction of the socket 94, the crank can be swung up into operative position and on release of the socket the socket engages the non-circular end of the crank so that the shaft is turned upon movement of crank 91.

The lever arrangement heretofore described accomplishes the object of moving the cover 31 upwardly relative to the stationary bottom 21. When the crank 91 is turned, a turning movement is imparted to the worm 78 on either side of the trailer and this turning movement results in horizontal, longitudinal movement of the nut 76 connected to the rear end of lever 61. By reason of the pivotal connection between the inner lever 61 and outer lever 51 through rod 62 and the fact that, as shown particularly in Fig. 2, in closed position the two levers are crossed at a slight angle and are biased toward a greater angle by counter-balancing spring 78, the action of the crank 91 is to move the cover upwardly, to the position shown in Fig. 1, the upper front end of lever 61 sliding rearwardly in tracks 67 in order to permit the raising movement, cover 31 being at all times horizontal.

The foregoing means for raising the cover 31 is, of course, subject to variation. Thus, instead of the threaded shaft 78 engaged by nut 76 on the end of lever 61 as shown in Fig. 9, a hydraulic or pneumatic cylinder 121 may be installed in horizontal position along the upper edge of the side 26, the outer end of the piston rod 123 of the cylinder being connected to the end of the lever 61 as shown in Fig. 10.

A lower bunk 106 is mounted stationary in the bottom extending transversely along the forward end thereof, the bunk being elevated from the floor 22 a sufficient distance to provide storage underneath the lower bunk. A movable upper bunk 107 is likewise provided, this bunk assuming the position when the trailer is closed closely adjacent the lower bunk 106 and when the trailer is open, as shown in Fig. 1, assuming the position elevated with respect to the lower bunk for access to the lower bunk and at the same time the upper bunk 107 is sufficiently below the top 32 to permit the occupant of the upper bunk to enter the same. The movement of the upper bunk 107 is accomplished by a secondary leverage system moved simultaneously with the movement of the main leverage which raises the cover 31. Thus, the transverse pivot shaft 62 which connects the outer and inner levers 51 and 61 extends transversely across the trailer and is connected by means of brackets 108 to the rear side of the upper bunk, thereby providing the support for the rear edge of the upper bunk. The forward edge of the upper bunk is pivotally connected to the transverse, connecting portion 109 of a U-shaped member 110 by means of brackets 111 on the transverse front edge of the bunk 107. The longitudinally extending sides 112 of the U-shaped member constitute links, the rearward end of each side 112 being provided with a roller 113 attached thereto by means of bolt 114, the roller 113 sliding within the track-way 74 and also being connected to the front end of horizontal, longitudinal link 77. The distance between roller 113 and roller 72 (which is the length of link 77) is equal to the distance between rod 62 and the transverse portion 109 of U-shaped member 110 and the length of the sides 112 of the member 110 is equal to the distance between rod 62 and roller 72. Thus, the parallelogram arrangement insures that the upper bunk 107 will remain horizontal as the cover 31 is raised but the movement of upper bunk 107 relative to cover 31 is smaller so that by the time the cover has reached its full open position the elevation of the upper bunk is considerably less than elevation of the cover.

A modified means for moving the rear ends of levers 61, 112 and 77 forwardly is illustrated more or less schematically in Fig. 10, it being understood that various other modified means may be employed. As shown in Fig. 10, a hydraulic or pneumatic cylinder 121 is mounted longitudinally on each side 26, there being a piston 122 within the cylinder with a piston rod 123 extending longitudinally forwardly out the front head of the cylinder. The front end of rod 123 is articulately connected by pin 124 to link 77. Thus as fluid pressure is applied to the rear end of the cylinder through inlet line 126, piston 122 is moved rearwardly, thereby moving link 77 in the same direction. Since link 77 is connected, in turn, both to link 61 and to lever 112, these members are actuated in the same manner as in the modification of Figs. 1–9.

In the modifications heretofore described the top 31 has been provided with depending sides 33 and a front 34 which fit outside the corresponding elements of the bottom 21. If desired, however, a top 131 may be provided which has no depending sides or front and which fits down on the upper edges of sides 26 and front 27 of bottom 21, all as illustrated in Figs. 11 and 12. In this modification the levers raising and lowering the top are located inside the confines of bottom 21 rather than outside. Main lever 51 is innermost of the actuating levers, the front transverse shaft member 53 being fastened to the underside of the top 131 by means of block 132 attached by bolts 133. Front transverse shaft member 52 is pivotally attached to the front wall (not shown in Fig. 11) by hangers 56.

Levers 61 cross levers 54 and are pivotally connected thereto at the midpoints of the crossed members by transverse rod 62 which is fastened to the rear edge of upper bunk 107 by brackets 108. The upper front end of lever 61 carries roller 63 which rides in track 67 fastened to the underside of top 131. The rear end of lever 61 carriers roller 72 which rides in trackway 74 attached to the inside of side 26. U-shaped member 110 is connected in similar manner as in the preceding modification, the transverse connecting portion 109 being connected to the front edge of upper bunk 107 by straps 111 and the lower ends of the sides 112 carry rollers 113 riding in trackways 74 fastened to the inside of side 26. Members (not shown) corresponding to members 77 connect rollers 72 and 113 for movement together. Either of the two previously described means, among others, may be employed to move rollers 72 and 113, the means illustrated in Fig. 12 showing one end of a screw 78 which is turned by cranking of shaft 86, the movement being transmitted through bevel gears 87 and 88 on shafts 86 and 78, respectively.

Although I have described my invention in some detail by way of illustration and example for purposes of clarity of understanding, it is understood that certain changes and modifications may be practiced within the spirit of the invention and scope of the appended claims.

What is claimed is:

1. A camping trailer comprising a bottom, wheels supporting said bottom, a top, a movable bunk between said top and bottom and means for raising said top and said bunk relative to said bottom, said means comprising a first lever on each side of said trailer, each said first lever being pivotally attached at one end to one end of said bottom and being pivotally attached at the opposite end to the opposite end of said top, a second lever on each side of said trailer, means longitudinally slidably and pivotally connecting one end of each said second lever to one end of said top and the opposite end of said second lever to the opposite end of said bottom, said first lever and said second lever on each side of said trailer being crossed, means pivotally connecting said first and second levers at their intersection, said last mentioned means being pivotally connected to said bunk, a link on each side of said trailer, one end of said link being pivotally connected to the opposite transverse edge of said bunk at one end, means longitudinally slidably and pivotally connecting the opposite end of each said link to said bottom, and means operable simultaneously to slide one end of each said second lever and one end of each said link longitudinally to raise and lower said top relative to said bottom and raise and lower said bunk relative to said bottom, the amplitude of movement of said top being greater than that of said bunk.

2. A camping trailer according to claim 1 which further comprises a transverse connecting member joining the ends of said links adjacent the forward transverse edge of said bunk to connect said links for pivotal movement.

3. A camping trailer according to claim 1 which further comprises a first transverse connecting member joining the ends of said links adjacent said bunk to connect said links for pivotal movement together, and second and third transverse members, said second transverse member being rigidly fixed to the front ends of said first levers and said third transverse member being rigidly fixed to the rear ends of said first levers, whereby said second and third transverse members and first levers comprise a rigid, substantially rectangular, unitary member.

4. A camping trailer according to claim 1 which further comprises a second bunk stationarily mounted on said bottom, said first mentioned bunk being positioned above said second bunk when said trailer is in closed position.

5. A clamping trailer comprising a bottom, wheels supporting said bottom, a top, a movable bunk between said top and bottom, and means for raising said top and said bunk relative to said bottom, said means comprising a first lever on each side of said trailer, one end of each said first lever being pivotally attached to one end of said bottom and the opposite end of each said first lever being pivotally attached to the opposite end of said top, a second lever on each side of said trailer, first tracks on opposite sides of one end of said top, second tracks on opposite sides of the opposite end of said bottom, means slidably and pivotally connecting one end of each said second lever to a corresponding first track, means slidably and pivotally connecting the other end of each said second lever to a corresponding second track, said first lever and said second lever on each side of said trailer being crossed, means pivotally connecting said first and second levers at their intersections, said last mentioned means being pivotally connected to said bunk, a link on each side of said trailer, one end of each said link being pivotally connected to a transverse edge of said bunk, means longitudinally slidably and pivotally connecting the opposite end of each said link to said bottom, and means operable simultaneously to slide one end of each said second lever and one end of each said link longitudinally in a corresponding second track to raise and lower said top relative to said bottom and raise and lower said bunk relative to said bottom, the amplitude of movement of said top being greater than that of said bunk.

6. A camping trailer according to claim 5 which further comprises a rigid, longitudinally extending connecting second link connecting the ends of said second levers and said first-mentioned links associated with said bottom for longitudinally slidable movement in said second tracks together.

7. A camping trailer according to claim 5 which further comprises a rigid, longitudinally extending connecting second link connecting the ends of said second levers and first-mentioned links associated with said bottom for longitudinally slidable movement in said second tracks together, and which comprises a first transverse connecting member joining the ends of said first-mentioned links adjacent said bunk for pivotal movement of said first-mentioned links together, and second and third transverse members, said second transverse member being rigidly fixed to the front ends of said first levers and said third transverse member being rigidly fixed to the rear ends of said first levers, whereby said second and third transverse members and first levers comprise a rigid, substantially rectangular, unitary member.

8. A camping trailer according to claim 5 in which said last mentioned means comprises a longitudinally extending screw rotatably mounted on said bottom, a nut in threaded engagement with said screw and pivotally connected to said second lever, and means for rotating said screw.

9. A camping trailer according to claim 8 in which said means for rotating said screw comprises a pair of transverse, rotatable shafts mounted on said bottom, means for transmitting rotary movement of said transverse shafts to said screws, and a crank, one end of said crank being connected to one of said transverse shafts, and means for releasably locking the opposite end of said crank to the other of said transverse shafts whereby upon cranking movement of said crank, said transverse shafts are revolved and said screws are likewise revolved.

10. A camping trailer according to claim 5 which further comprises a cylinder mounted on each side of said bottom, a piston in each said cylinder, a piston rod connected to said piston extending from each said cylinder, means connecting the outer end of said piston rod to one of said second levers and means for applying fluid pressure within said cylinders to move said pistons longitudinally of said trailer to raise and lower said top relative to said bottom.

References Cited in the file of this patent

UNITED STATES PATENTS

| | | |
|---|---|---|
| 399,220 | Trimroth | Mar. 5, 1889 |
| 1,138,715 | Young | May 11, 1915 |
| 1,261,633 | Shuford | Apr. 2, 1918 |
| 2,501,001 | Neely | Mar. 21, 1950 |
| 2,561,921 | Guillot | July 24, 1951 |
| 2,706,102 | Cresci | Apr. 12, 1955 |
| 2,729,497 | Runyan | Jan. 3, 1956 |

FOREIGN PATENTS

| | | |
|---|---|---|
| 573,470 | Germany | Dec. 22, 1929 |
| 630,933 | Great Britain | Oct. 24, 1949 |